(12) United States Patent
Xie

(10) Patent No.: US 10,730,757 B1
(45) Date of Patent: Aug. 4, 2020

(54) METHOD FOR PREPARING SSZ-26/33 ZEOLITES

(71) Applicant: CHEVRON U.S.A. INC., San Ramon, CA (US)

(72) Inventor: Dan Xie, El Cerrito, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 16/567,752

(22) Filed: Sep. 11, 2019

(51) Int. Cl.
*C01B 39/48* (2006.01)
*C01B 39/02* (2006.01)
*B01J 29/70* (2006.01)

(52) U.S. Cl.
CPC ............ *C01B 39/48* (2013.01); *C01B 39/026* (2013.01); *B01J 29/70* (2013.01); *C01P 2002/72* (2013.01); *C01P 2004/03* (2013.01)

(58) Field of Classification Search
CPC ........ C01B 39/026; C01B 39/48; B01J 29/70; C01P 2002/72; C01P 2004/03
See application file for complete search history.

(56) References Cited

U.S. PATENT DOCUMENTS

| | | | |
|---|---|---|---|
| 4,910,006 A | 3/1990 | Zones et al. | |
| 4,963,337 A | 10/1990 | Zones | |
| 5,120,425 A * | 6/1992 | Zones | B01J 29/04 208/111.01 |
| 5,271,922 A * | 12/1993 | Nakagawa | C01B 37/02 423/328.2 |
| 6,821,502 B2 | 11/2004 | Elomari et al. | |
| 7,022,308 B1 | 4/2006 | Yuen et al. | |
| 7,208,135 B2 * | 4/2007 | Sterzel | B82Y 30/00 423/263 |
| 7,648,694 B2 | 1/2010 | Burton, Jr. | |
| 7,837,978 B2 | 11/2010 | Burton, Jr. | |
| 8,007,763 B2 | 8/2011 | Zones | |
| 8,647,601 B2 | 2/2014 | Elomari et al. | |
| 9,815,706 B2 * | 11/2017 | Nicholas | C01B 39/48 |

OTHER PUBLICATIONS

Lobo et al, "Synthesis and Rietveld Refinement of the Small-pore Zeolite SSZ-16" Chem Mater., 1996, pp. 2409-2411 (Year: 1996).*
S.I. Zones, M.M. Olmstead and D.S. Santilli "Guest/Host Relationships in the Synthesis of Large Pore Zeolite SSZ-26 from a Propellane Quaternary Ammonium Compound" J. Am. Chem. Soc. 1992, 114, 4195-4201.
R.F. Lobo, M. Pan, I. Chan, H-X. Li, R.C. Medrud, S.I. Zones, P.A. Crozier and M.E. Davis "SSZ-26 and SSZ-33: Two Molecular Sieves with Intersecting 10- and 12-Ring Pores" Science 1993, 262 (5139), 1543-1546.
R.F. Lobo, M. Pan, I. Chan, R.C. Medrud, S.I. Zones, P.A. Crozier and M.E. Davis "Physicochemical Characterization of Zeolites SSZ-26 and SSZ-33" J. Phys. Chem. 1994, 98, 12040-12052.

* cited by examiner

*Primary Examiner* — David M Brunsman

(57) ABSTRACT

A method is provided for synthesizing a zeolite of the SSZ-26/33 family of zeolites using 1-benzyl-4-aza-1-azoniabicyclo[2.2.2]octane as a structure directing agent.

12 Claims, 2 Drawing Sheets

METHOD FOR PREPARING SSZ-26/33 ZEOLITES

FIELD

This disclosure relates to the synthesis of zeolites belonging to the SSZ-26/33 family of zeolites.

BACKGROUND

Zeolites SSZ-26 and SSZ-33 are members of a family of microporous crystalline materials in which the two end members are formed by the stacking of layers in an ABAB... sequence or an ABCABC... sequence. The framework formed by the ABAB... stacking sequence (polymorph A) is of orthorhombic symmetry while the framework formed by the ABCABC... stacking sequence (polymorph B) is of monoclinic symmetry. Between these two end member polymorphs, there is a family of materials that can be characterized by a fault probability (p). The fault probabilities of p=0% and p=100% represent the end members polymorph B and polymorph A, respectively. The aluminosilicate zeolite SSZ-26 and the borosilicate zeolite SSZ-33 are members of this family of materials having fault probabilities of about 15% and about 30%, respectively. These zeolites have a three-dimensional pore system containing intersecting 10-and 12-ring pores.

The composition and characterizing X-ray diffraction pattern of zeolite SSZ-26 are disclosed in U.S. Pat. No. 4,910,006, which also describes the preparation of the zeolite using a hexamethyl[4.3.3.0]propellane-8,11-diammonium cation as a structure directing agent.

The composition and characterizing X-ray diffraction pattern of zeolite SSZ-33 are disclosed in U.S. Pat. No. 4,963,337, which also describes the preparation of the zeolite using a tricyclo[5.2.1.0$^{2,6}$]decane quaternary ammonium cation as a structure directing agent.

U.S. Pat. No. 7,648,694 discloses a method for preparing SSZ-26/33 zeolites using a structure directing agent selected from 1,5-bis(N,N-dimethylcyclohexylammonium)pentane dications, 1,4-bis(N-cyclohexylpiperidinium)butane dications, and 1,4-bis(N-cyclopentylpiperidinium)butane dications.

U.S. Pat. No. 7,837,978 discloses a process for preparing SSZ-26 using a structure directing agent comprising a cis-N,N-diethyldecahydroquinolinium cation or a mixture of a cis-N,N-diethyldecahydroquinolinium cation and a trans-N,N-diethyldecahydroquinolinium cation.

U.S. Pat. No. 8,647,601 discloses the synthesis of SSZ-33 using 1,1'-(pentane-1,5-diyl)bis(3-methylcyclohexyl)piperidinium dications as a structure directing agent.

There is significant interest in finding alternative, less expensive structure directing agents for the synthesis of zeolites of SSZ-26/33 family of zeolites.

According to the present disclosure, it has now been found that the relatively simple cations described herein can be effective as structure directing agents in the synthesis of zeolites of the SSZ-26/33 family of zeolites.

SUMMARY

In one aspect, there is provided a method of synthesizing a zeolite of the SSZ-26/33 family of zeolites, the method comprising: (a) providing a reaction mixture comprising: (1) a source of silica; (2) a source of an oxide of a tetravalent element (X); (3) a source of a Group 1 or Group 2 metal (M); (4) a structure directing agent (Q) comprising 1-benzyl-4-aza-1-azoniabicyclo[2.2.2]octane cations; (5) a source of hydroxide ions; (6) water; and (7) seed crystals of a zeolite of the SSZ-26/33 family of zeolites; and (b) subjecting the reaction mixture to crystallization conditions sufficient to form crystals of a zeolite of the SSZ-26/33 family of zeolites.

In another aspect, there is provided a zeolite of the SSZ-26/33 family of zeolites and, in its as-synthesized form, comprising 1-benzyl-4-aza-1-azoniabicyclo[2.2.2]octane cations in its pores.

DETAILED DESCRIPTION

Definitions

Figure 1:
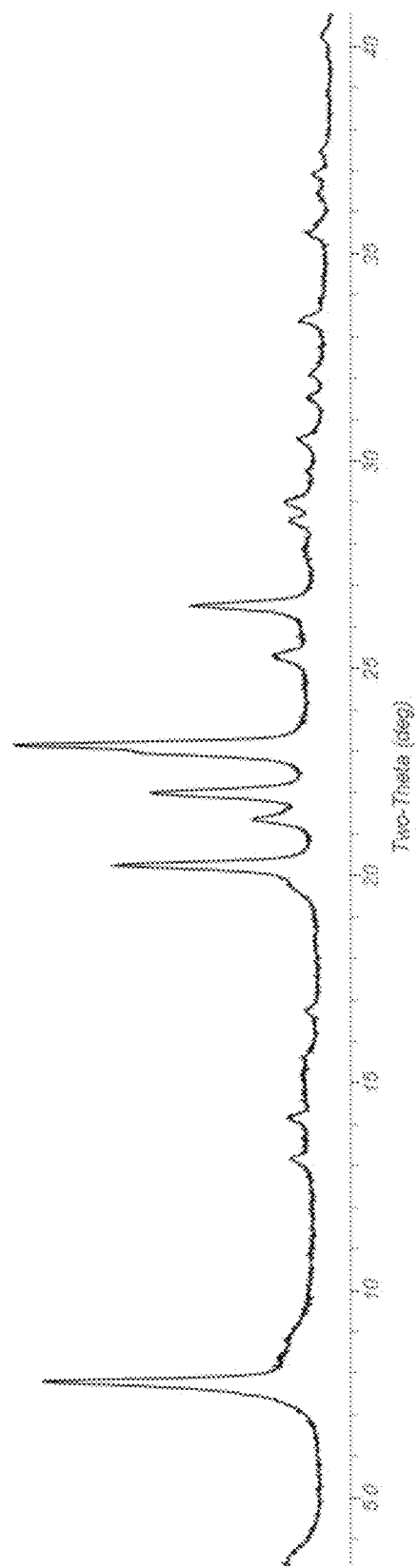
FIG. 1 shows a powder X-ray diffraction (XRD) pattern of the as-synthesized zeolite prepared in Example 1.

The term "as-synthesized" is employed herein to refer to a zeolite in its form after crystallization, prior to removal of the structure directing agent.

The term "anhydrous" is employed herein to refer to a zeolite substantially devoid of both physically adsorbed and chemically adsorbed water.

As used herein, the numbering scheme for the Periodic Table Groups is as disclosed in Chem. Eng. News 1985, 63(5), 26-27.

Synthesis of the Zeolite

A zeolite of the SSZ-26/33 family of zeolites can be synthesized by: (a) providing a reaction mixture comprising: (1) a source of silica; (2) a source of an oxide of a trivalent element (X); (3) a source of a Group 1 or Group 2 metal (M); (4) a structure directing agent (Q) comprising 1-benzyl-4-aza-1-azoniabicyclo[2.2.2]octane cations; (5) a source of hydroxide ions; (6) water and (7) seed crystals of a zeolite of the SSZ-26/33 family of zeolites; and (b) subjecting the reaction mixture to crystallization conditions sufficient to form crystals of a zeolite of the SSZ-26/33 family of zeolites.

The reaction mixture can have a composition, in terms of molar ratios, within the ranges set forth in Table 1:

TABLE 1

| Reactants | Useful | Preferred |
| --- | --- | --- |
| $SiO_2/X_2O_3$ | 30 to 120 | 50 to 100 |
| $M/SiO_2$ | 0.05 to 0.50 | 0.05 to 0.30 |
| $Q/SiO_2$ | 0.05 to 0.50 | 0.05 to 0.15 |
| $OH/SiO_2$ | 0.10 to 0.50 | 0.15 to 0.30 |
| $H_2O/SiO_2$ | 20 to 80 | 25 to 50 | wherein X is a trivalent element; M is a Group 1 or Group 2 metal; and Q comprises 1-benzyl-4-aza-1-azoniabicyclo[2.2.2]octane cations.

Suitable sources of silica can include fumed silica, colloidal silica, precipitated silica, alkali metal silicates and tetraalkyl orthosilicates. Suitable sources of the trivalent element X can depend on the element X selected. In embodiments where X comprises or is aluminum, suitable sources of aluminum can include hydrated alumina, aluminum hydroxide, alkali metal aluminates, aluminum alkoxides (e.g., aluminum triisopropoxide), and water-soluble aluminum salts (e.g., aluminum nitrate). Combined sources of aluminum and silica can additionally or alternatively be used and can include clays or treated clays (e.g., metakaolin) and aluminosilicate zeolites (e.g., zeolite Y). In some aspects, zeolite Y can be the only silica and aluminum source to form the zeolite of the SSZ-26/33 family of zeolites.

The Group 1 or Group 2 metal (M) can be any M-containing compound not detrimental to crystallization process can be used. The Group 1 or Group 2 metal can be sodium or potassium. Sources of the Group 1 or Group 2 metal can include metal hydroxide, metal oxide, metal halide, metal sulfate, metal nitrate, and metal carboxylate. As used here, the phrase "Group 1 or Group 2 metal" does not mean the Group 1 metals and Group 2 metals are used in the alternative, but instead that one or more Group 1 metals can be used alone or in combination with one or more Group 2 metals and that one or more Group 2 metals can be used alone or in combination with one or more Group 1 metals.

The structure directing agent (Q) comprises 1-benzyl-4-aza-1-azoniabicyclo[2.2.2]octane cations, represented by the following structure (1):

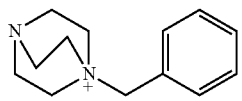

(1)

Suitable sources of Q are the hydroxides and/or other salts of the quaternary ammonium compound.

The reaction mixture also contains seed crystals of a zeolite of the SSZ-26/33 family of zeolites, such as SSZ-26 or SSZ-33, desirably in an amount of from 0.01 to 10,000 ppm by weight (e.g., 100 to 5000 ppm by weight) of the reaction mixture. Seeding can be advantageous in decreasing the amount of time necessary for complete crystallization to occur. In addition, seeding can lead to an increased purity of the product obtained by promoting the nucleation and/or formation of a zeolite of the SSZ-26/33 family of zeolites over any undesired phases.

The reaction mixture components can be supplied by more than one source. Additionally or alternatively, two or more reaction mixture components can be provided by one source.

The reaction mixture can be prepared either batch wise or continuously. Crystal size, morphology and crystallization time of the zeolite described herein can vary with the nature of the reaction mixture and the crystallization conditions.

Crystallization of the zeolite from the above reaction mixture can be carried out under either static, tumbled or stirred conditions in a suitable reactor vessel, such as for example polypropylene jars or Teflon-lined or stainless-steel autoclaves, at a temperature of from 125° C. to 200° C. (e.g., 150° C. to 180° C.) for a time sufficient for crystallization to occur at the temperature used, e.g., from about 48 to 500 hours. Crystallization is usually carried out in an autoclave so that the reaction mixture is subject to autogenous pressure.

Once the desired zeolite crystals have formed, the solid product can be separated from the reaction mixture by standard mechanical separation techniques such as centrifugation or filtration. The crystals can be water-washed and then dried to obtain the as-synthesized zeolite crystals. The drying step can be performed at an elevated temperature (e.g., 75° C. to 150° C.) for several hours (e.g., 4 to 24 hours). The drying step can be performed under vacuum or at atmospheric pressure.

As a result of the crystallization process, the recovered crystalline zeolite product contains within its pores at least a portion of the structure directing agent used in the synthesis.

The as-synthesized zeolite can be subjected to treatment to remove part or all of the structure directing agent used in its synthesis. Removal of the structure directing agent can be carried out by thermal treatment (e.g., calcination) in which the as-synthesized zeolite is heated at a temperature sufficient to remove part or all of the structure directing agent. While sub-atmospheric pressure can be used for the thermal treatment, atmospheric pressure is desired for reasons of convenience. The thermal treatment can be performed at a temperature at least 370° C. for at least a minute and generally not longer than 20 hours (e.g., from 1 to 12 hours). The thermal treatment can be performed at a temperature of up to 925° C. For example, the thermal treatment can be conducted at a temperature of 400° C. to 600° C. in the presence of an oxygen-containing gas for approximately 1 to 8 hours. Additionally or alternatively, the structure directing agent can be removed by treatment with ozone.

Any extra-framework Group 1 or Group 2 metal cations in the zeolite can be replaced in accordance with techniques well known in the art by ion exchange with other cations. Replacing cations can include metal ions (e.g., rare earth metals and metals of Groups 2 to 15 of the Periodic Table), hydrogen ions, hydrogen precursor ions (e.g., ammonium ions), and combinations thereof.

Characterization of the Zeolite

In its as-synthesized and anhydrous form, the present zeolite can have a chemical composition, in terms of molar ratios, within the ranges set forth in Table 2:

TABLE 2

|  | Broadest | Preferred |
|---|---|---|
| $SiO_2/X_2O_3$ | 20 to 120 | 40 to 80 |
| $Q/SiO_2$ | >0 to 0.1 | >0 to 0.1 |
| $M/SiO_2$ | >0 to 0.1 | >0 to 0.1 | wherein X is a trivalent element; Q comprises 1-benzyl-4-aza-1-azoniabicyclo[2.2.2] octane cations; and M is a Group 1 or Group 2 metal.

It should be noted that the as-synthesized form of the present zeolite can have molar ratios different from the molar ratios of reactants of the reaction mixture used to prepare the as-synthesized form. This result can occur due to incomplete incorporation of 100% of the reactants of the reaction mixture into the crystals formed (from the reaction mixture).

The powder X-ray diffraction lines of Tables 3 and 4 are representative of as-synthesized SSZ-26 and SSZ-33-type zeolites, respectively.

TABLE 3

Characteristic Peaks for As-Synthesized SSZ-26

| 2-Theta[a] | d-spacing, nm | Relative Intensity[b] |
|---|---|---|
| 7.77 | 1.137 | VS |
| 20.27 | 0.438 | VS |
| 21.92 | 0.405 | S |
| 22.76 | 0.390 | S |

TABLE 3-continued

Characteristic Peaks for As-Synthesized SSZ-26

| 2-Theta[a] | d-spacing, nm | Relative Intensity[b] |
|---|---|---|
| 22.92 | 0.388 | VS |
| 26.53 | 0.336 | M |

[a]±0.20
[b]The powder XRD pattern provided is based on a relative intensity scale in which the strongest line in the XRD pattern is assigned a value of 100: W = weak (>0 to <20); M = medium (≥20 to ≤40); S = strong (>40 to ≤60); VS = very strong (>60 to ≤100).

TABLE 4

Characteristic Peaks for As-Synthesized SSZ-33

| 2-Theta[a] | d-spacing, nm | Relative Intensity[b] |
|---|---|---|
| 7.90 | 1.119 | VS |
| 20.60 | 0.431 | VS |
| 21.61 | 0.411 | M |
| 22.18 | 0.400 | S |
| 23.20 | 0.383 | VS |
| 27.01 | 0.330 | M |

[a]±0.20
[b]The powder XRD pattern provided is based on a relative intensity scale in which the strongest line in the XRD pattern is assigned a value of 100: W = weak (>0 to <20); M = medium (≥20 to ≤40); S = strong (>40 to ≤60); VS = very strong (>60 to ≤100).

The powder X-ray diffraction lines of Tables 5 and 6 are representative of calcined SSZ-26 and SSZ-33-type zeolites, respectively.

TABLE 5

Characteristic Peaks for Calcined SSZ-26

| 2-Theta[a] | d-spacing, nm | Relative Intensity[b] |
|---|---|---|
| 7.75 | 1.140 | VS |
| 20.21 | 0.439 | M |
| 21.29 | 0.417 | W |
| 21.93 | 0.405 | M |
| 22.87 | 0.389 | M |
| 23.07 | 0.385 | S |
| 26.49 | 0.336 | M |

[a]±0.20
[b]The powder XRD pattern provided is based on a relative intensity scale in which the strongest line in the XRD pattern is assigned a value of 100: W = weak (>0 to <20); M = medium (≥20 to ≤40); S = strong (>40 to ≤60); VS = very strong (>60 to ≤100).

TABLE 6

Characteristic Peaks for Calcined SSZ-33

| 2-Theta[a] | d-spacing, nm | Relative Intensity[b] |
|---|---|---|
| 7.91 | 1.116 | VS |
| 20.61 | 0.431 | M |
| 21.62 | 0.411 | W |
| 22.20 | 0.400 | M |
| 23.20 | 0.381 | S |
| 27.02 | 0.330 | W |

[a]±0.20
[b]The powder XRD pattern provided is based on a relative intensity scale in which the strongest line in the XRD pattern is assigned a value of 100: W = weak (>0 to <20); M = medium (≥20 to ≤40); S = strong (>40 to ≤60); VS = very strong (>60 to ≤100).

The powder X-ray diffraction patterns presented herein were collected by standard techniques. The radiation was CuKα radiation. The peak heights and the positions, as a function of 2θ where θ is the Bragg angle, were read from the relative intensities of the peaks (adjusting for background), and d, the interplanar spacing corresponding to the recorded lines, can be calculated.

Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can also result from variations in the organic compound used in the preparation. Calcination can also cause minor shifts in the XRD pattern. Notwithstanding these minor perturbations, the basic crystal lattice structure remains unchanged.

EXAMPLES

The following illustrative examples are intended to be non-limiting.

Example 1

3.95 g of deionized water, 0.19 g of a 45% KOH solution, 1.05 g of a 21% 1-benzyl-4-aza-1-azoniabicyclo[2.2.2]octane hydroxide solution, 0.04 g of 50% Reheis F-2000 aluminum hydroxide dried gel, 2.00 g of LUDOX® AS-30 colloidal silica (30 wt. % suspension in water) and 0.12 g of Al-SSZ-33 seeds were mixed together in a Teflon liner. The resulting gel was stirred until it became homogeneous. The liner was then capped and placed within a Parr steel autoclave reactor. The autoclave was then put in an oven heated at 170° C. for 4 days with tumbling at 43 rpm. The solid products were recovered from the cooled reactor by centrifugation, washed with deionized water and dried at 95° C.

Figure 2:
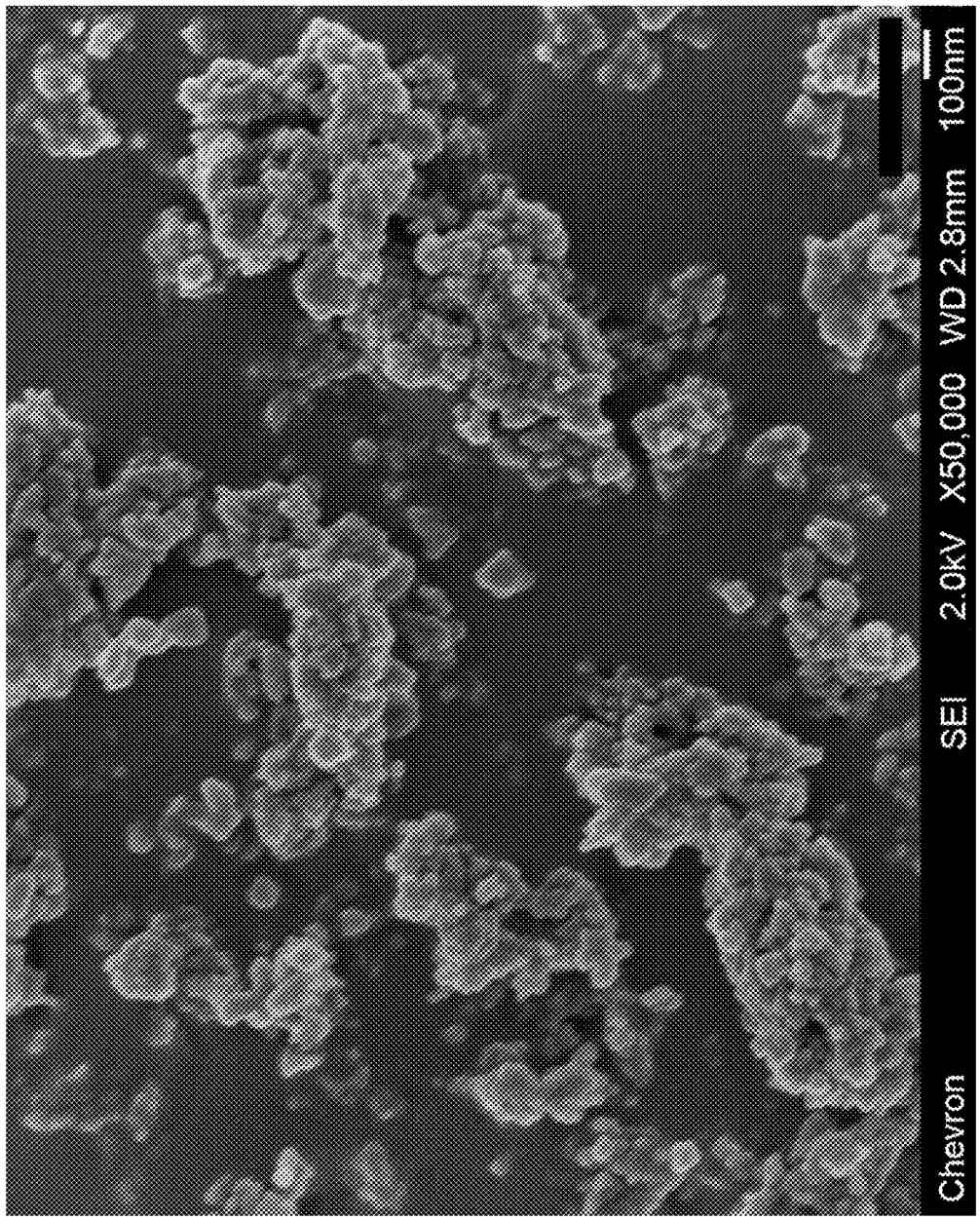
FIG. 2 shows a Scanning Electron Micrograph (SEM) image of the as-synthesized zeolite prepared in Example 1.

The resulting product was analyzed by powder XRD and SEM. The powder X-ray diffraction pattern is shown FIG. 1 and indicates that the material is a member of the SSZ-26/33 family. A SEM image of the product is shown in FIG. 2 and indicates a uniform field of crystals.

The product has a $SiO_2/Al_2O_3$ molar ratio of 44.1, according to Inductively Coupled Plasma (ICP) elemental analysis.

Example 2

4.39 g of deionized water, 0.12 g of a 45% KOH solution, 0.52 g of a 21% 1-benzyl-4-aza-1-azoniabicyclo[2.2.2]octane hydroxide solution, 0.04 g of 50% Reheis F-2000 aluminum hydroxide dried gel, 2.00 g of LUDOX® AS-30 colloidal silica and 0.12 g of Al-SSZ-33 seeds were mixed together in a Teflon liner. The resulting gel was stirred until it became homogeneous. The liner was then capped and placed within a Parr steel autoclave reactor. The autoclave was then put in an oven heated at 160° C. for 15 days with tumbling at 43 rpm. The solid products were recovered from the cooled reactor by centrifugation, washed with deionized water and dried at 95° C.

The resulting product was identified by powder XRD and SEM as a member of the SSZ-26/33 family.

The product had a $SiO_2/Al_2O_3$ molar ratio of 43.2, according to ICP elemental analysis.

Example 3

2.20 g of deionized water, 0.06 g of a 45% KOH solution, 0.26 g of a 21% 1-benzyl-4-aza-1-azoniabicyclo[2.2.2]octane hydroxide solution, 0.01 g of 50% Reheis F-2000 aluminum hydroxide dried gel, 1.00 g of LUDOX® AS-30 colloidal silica and 0.06 g of Al-SSZ-33 seeds were mixed together in a Teflon liner. The resulting gel was stirred until it became homogeneous. The liner was then capped and placed within a Parr steel autoclave reactor. The autoclave was then put in an oven heated at 160° C. for 8 days with tumbling at 43 rpm. The solid products were recovered from the cooled reactor by centrifugation, washed with deionized water and dried at 95° C.

The resulting product was identified by powder XRD and SEM as a member of the SSZ-26/33 family.

The product has a $SiO_2/Al_2O_3$ molar ratio of 74.6, according to ICP elemental analysis.

Example 4

2.20 g of deionized water, 0.08 g of a 50% NaOH solution, 0.26 g of a 21% 1-benzyl-4-aza-1-azoniabicyclo[2.2.2]octane hydroxide solution, 0.01 g of 50% Reheis F-2000 aluminum hydroxide dried gel, 1.00 g of LUDOX® AS-30 colloidal silica and 0.06 g of Al-SSZ-33 seeds were mixed together in a Teflon liner. The resulting gel was stirred until it became homogeneous. The liner was then capped and placed within a Parr steel autoclave reactor. The autoclave was then put in an oven heated at 160° C. for 6 days with tumbling at 43 rpm. The solid products were recovered from the cooled reactor by centrifugation, washed with deionized water and dried at 95° C.

The resulting product was identified by powder XRD and SEM as a member of the SSZ-26/33 family.

The product has a $SiO_2/Al_2O_3$ molar ratio of 71.3, according to ICP elemental analysis.

Example 5

4.36 g of deionized water, 0.10 g of a 50% NaOH solution, 0.85 g of a 21% 1-benzyl-4-aza-1-azoniabicyclo[2.2.2]octane hydroxide solution, 0.50 g of CBV 780 Y-zeolite powder (Zeolyst International, $SiO_2/Al_2O_3$ molar ratio=80) and 0.10 g of Al-SSZ-33 seeds were mixed together in a Teflon liner. The resulting gel was stirred until it became homogeneous. The liner was then capped and placed within a Parr steel autoclave reactor. The autoclave was then put in an oven heated at 170° C. for 6 days without tumbling. The solid products were recovered from the cooled reactor by centrifugation, washed with deionized water and dried at 95° C.

The resulting product was identified by powder XRD and SEM as a member of the SSZ-26/33 family.

The product has a $SiO_2/Al_2O_3$ molar ratio of 72.7, according to ICP elemental analysis.

Example 6

The as-synthesized zeolite product from Example 1 was calcined inside a muffle furnace under a flow of air heated to 540° C. at a rate of 1° C./minute and held at 540° C. for 5 hours, cooled and then analyzed by powder XRD. The powder XRD data indicated that the material remains stable after calcination to remove the structure directing agent.

Example 7

The calcined material from Example 4 was treated with 10 mL (per g of zeolite) of a 1 N ammonium nitrate solution at 95° C. for 2 hours. The solution was cooled, decanted off and the same process repeated.

The product after drying was subjected to a micropore volume analysis using $N_2$ as adsorbate and via the BET method. The zeolite exhibited a micropore volume of 0.18 cm$^3$/g.

The invention claimed is:

1. A method of synthesizing a zeolite of the SSZ-26/33 family of zeolites, the method comprising:
   (a) providing a reaction mixture comprising:
      (1) a source of silica;
      (2) a source of an oxide of a trivalent element (X);
      (3) a source of a Group 1 or Group 2 metal (M);
      (4) a structure directing agent (Q) comprising 1-benzyl-4-aza-1-azoniabicyclo[2.2.2]octane cations;
      (5) a source of hydroxide ions;
      (6) water; and
      (7) seed crystals of a zeolite of the SSZ-26/33 family of zeolites; and
   (b) subjecting the reaction mixture to crystallization conditions sufficient to form crystals of the zeolite.

2. The method of claim 1, wherein the reaction mixture has a composition, in terms of molar ratios, as follows:

| | |
|---|---|
| $SiO_2/X_2O_3$ | 30 to 120 |
| $M/SiO_2$ | 0.05 to 0.50 |
| $Q/SiO_2$ | 0.05 to 0.50 |
| $OH/SiO_2$ | 0.10 to 0.50 |
| $H_2O/SiO_2$ | 20 to 80. |

3. The method of claim 1, wherein the reaction mixture has a composition, in terms of molar ratios, as follows:

| | |
|---|---|
| $SiO_2/X_2O_3$ | 50 to 100 |
| $M/SiO_2$ | 0.05 to 0.30 |
| $Q/SiO_2$ | 0.05 to 0.15 |
| $OH/SiO_2$ | 0.15 to 0.30 |
| $H_2O/SiO_2$ | 25 to 50. |

4. The method of claim 1, wherein the trivalent element (X) comprises aluminum.

5. The method of claim 4, wherein the source of aluminum is selected from the group consisting of hydrated alumina, aluminum hydroxide, alkali metal aluminates, aluminum alkoxides, water-soluble aluminum salts, and combinations thereof.

6. The method of claim 4, wherein zeolite Y is the only silica and aluminum source in the reaction mixture.

7. The method of claim 1, wherein the reaction mixture comprises from 0.01 to 10,000 ppm by weight of seed crystals.

8. The method of claim 1, wherein the crystallization conditions include a temperature in a range of from 125° C. to 200° C.

9. A zeolite of the SSZ-26/33 family of zeolites and, in its as-synthesized form, comprising 1-benzyl-4-aza-1-azoniabicyclo[2.2.2]octane cations in its pores.

10. The zeolite of claim 9, having a molar ratio of $SiO_2/X_2O_3$ in a range of 20 to 120, wherein X is a trivalent element.

11. The zeolite of claim 10, wherein the molar ratio of $SiO_2/X_2O_3$ is in a range of 40 to 80.

12. The zeolite of claim 10, wherein the trivalent element (X) comprises aluminum.

* * * * *